Aug. 8, 1967  R. A. TIDBALL  3,335,083
SOLID-LIQUID SEA WATER HEATER WITH SCALE REMOVING FEATURES
Filed April 27, 1964
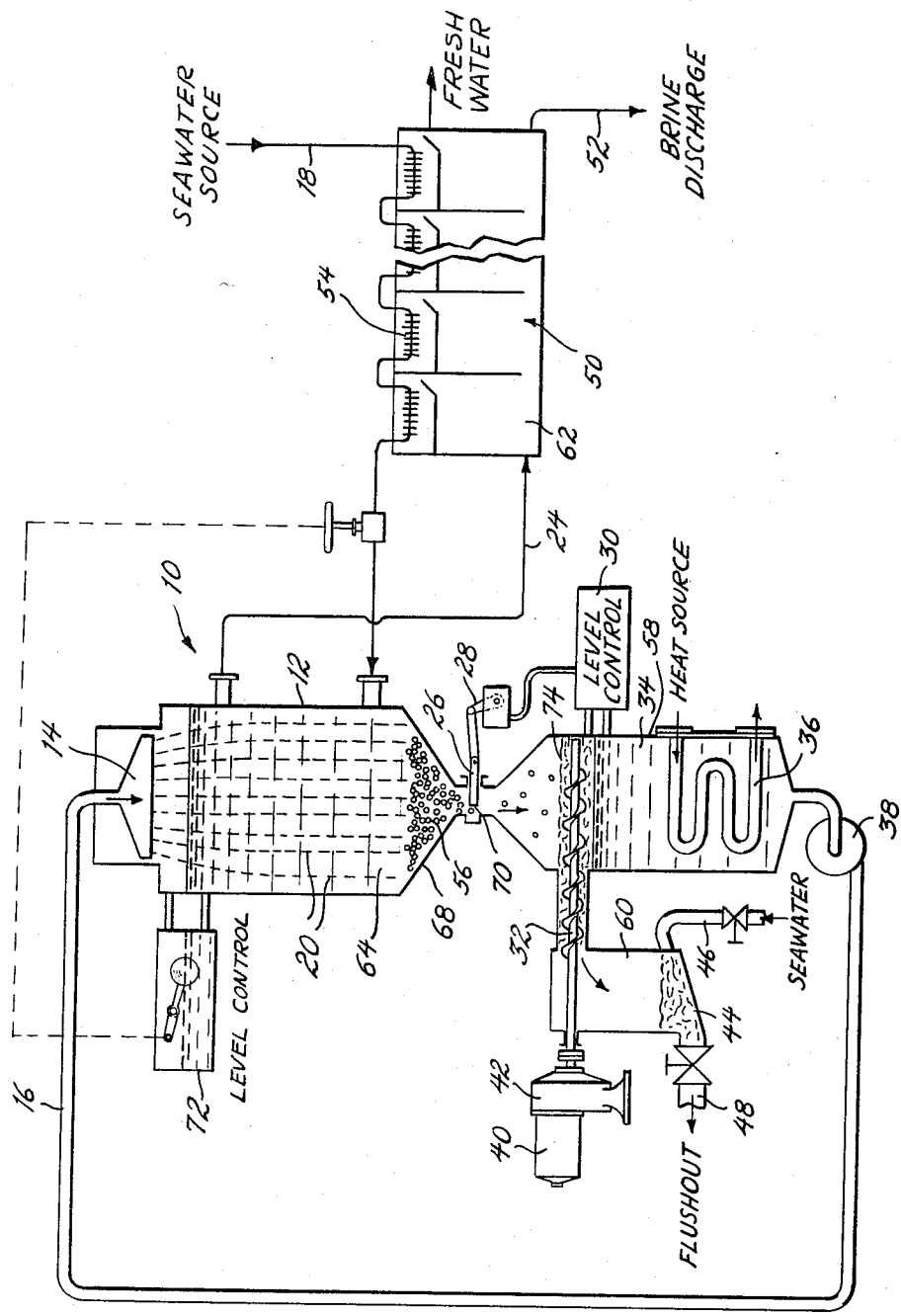
INVENTOR.
ROBERT A. TIDBALL
BY Arthur H. Seidel
ATTORNEY 3,335,083
SOLID-LIQUID SEA WATER HEATER WITH
SCALE REMOVING FEATURES
Robert A. Tidball, Swarthmore, Pa., assignor to Baldwin-Lima-Hamilton Corporation, Philadelphia, Pa., a corporation of Delaware
Filed Apr. 27, 1964, Ser. No. 362,602
6 Claims. (Cl. 210—56)

This invention relates to a method and apparatus for recovering potable water from sea water.

A serious problem has arisen in recent times regarding the adequacy of present fresh water supplies. Due to increasing world population, extensive irrigation projects, etc., the present supply of available fresh water is falling below the growing demand. A virtually untapped source of fresh water, the earth's oceans, can be drawn upon to fill the demand. However, large scale conversion of sea water to fresh water, to date, has been impractical and commercially unfeasible. The main difficulties in present day conversion techniques of sea water to fresh water involve the scaling, foaming, corrosion, etc., accompanying conventional multistage flash distilling plant operation.

Because of the fact that the scaling salts found in sea water will only precipitate out of the sea water above certain temperatures, one proposed solution has been to maintain the temperature of the sea water in the distilling plant below these critical precipitating temperatures. However, this will result in a loss of thermal energy available to heat the fresh brine being introduced into the distilling plant and decrease the flashing rate in each flash chamber thereby resulting in an inefficient and costly operation.

Accordingly, it is one of the primary objects of this invention to disclose a sea water heater which is designed to raise the temperature of a brine solution to as high a temperature as possible, prior to feeding it into the first flash stage of a multistage distilling plant.

Another main object of this invention is to disclose a sea water heater of the aforementioned character in which most of the scaling constituents present in the brine being distilled can be removed prior to feeding the brine into the first flash stage of the distilling plant thereby eliminating the usual scaling problems associated with conventional distilling plants.

Another object of this invention is to supply a scale-free brine discharge stream from a multistage fresh distilling plant for use in other equipment.

Yet another object of this invention is to achieve the heating of sea water without requiring heat transfer through the walls of a boiler.

Other objects will appear hereinafter.

For the purpose of illustrating the invention, there is shown in the drawings a form which is presently preferred; it being understood, however, that this invention is not limited to the precise arrangements and instrumentalities shown.

The single figure in the drawing is a schematic flow diagram illustrating the apparatus and method used in carrying out the principles of the present invention.

Referring now to the drawing in detail, the system 10 includes a brine heater 12 into which sea water or brine 64 is delivered by a conduit 18 from a suitable source of sea water. The brine 64 on its way to the heater 12, passes through the condensers 54 in each stage of a multistage flash distilling plant 50. The condensers will heat the brine 64 reducing the heat input required in the sea water heater. However, the maximum temperature to which the brine can be heated in the distilling plant is severely limited because above certain temperatures, the scaling constituents in the brine will begin to precipitate out on the condensing surfaces. Hence, the auxiliary heater 12 is used to further increase the temperature of the brine and to remove the scale in the brine solution before the brine is sent into the first flash chamber.

The level of sea water maintained within the brine heater 12 is controlled by a suitable device 72. A device such as 72 is well known in the art and may comprise for example, a float mechanism connected to a valve at the sea water inlet to the brine heater 12.

A conduit 16 extends from a reservoir 58 of molten metal 34 into the top of the brine heater 12. The conduit 16 terminates in an elongated spray head 14 above the brine level within the brine heater 12. The temperature of the upflowing brine 64 within the heater 12 is maintained below the melting point of the molten metal 34 pumped through the conduit 16 by a pump 38 from the reservoir 58. The spray head 14 will distribute the molten metal in a plurality of distributed sprays 20 into the brine 64. Since the temperature of the brine is below the melting point of the molten metal 34, it will solidify upon contact with the brine.

As the molten metal 34 falls through the brine 64 it will solidify into small shot or globules. In solidifying, the metal will not only give up its own heat to the brine 64, but will transfer its latent heat of solidification to the brine solution, thereby reducing the molten metal flow below that required for a circulatory liquid or solid shot to achieve the same heating effect.

The heated brine passes into a conduit 24, and into the first stage flash chamber 62 of the multistage flash distilling plant 50. A portion of the heated brine is flashed into vapor which heats the fresh sea water flowing through the associated condenser 54, is condensed and taken out of the system as distillate. The remainder of the heated brine flows into the next stage and is further distilled in conventional fashion. The distillate from all stages is collected as fresh water.

The distilled brine is discharge from the last flash stage through a conduit 52.

As discussed previously, sea water contains salts in addition to sodium chloride, which, as their temperatures are increased, precipitate out of the brine solution and form scale on the flash chamber walls, the condenser tubes, and brine heater walls. Principal scaling salts are calcium carbonate, calcium sulfate, and magnesium hydroxide. However, the scaling problem is virtually eliminated by the formation of the solid metal shots within the brine heater 12.

Since the solid shots and liquid droplets entering the brine 64 are at a higher temperature than the brine and the vessel walls, the scaling constituents within the brine will precipitate and cling to the shot as it drops through the brine. The metal shot on which the scaling salts precipitate and cling are collected in a hopper 68 at the bottom of the brine heater 12. From the hopper 68 the shot and clinging scaling salts are allowed to fall into the reservoir 58. Disposed within the reservoir 58 is a heat exchanger 36. The heat exchanger may be of any conventional type. The metal shot is remelted within the reservoir 58 by the heat exchanger 36. During the melting of the shot, the scale breaks free and since it is less dense than the molten metal, it forms a separate layer 74 above the remelted metal 34. A screw conveyor 32 driven by a motor 40 connected to the conveyor through a speed reduction unit 42 is adapted to remove the scale 74 into a scale receiving vessel 60. The scale 44 within the vessel 60 may be flushed out by sea water entering through a conduit 46. The scale and mixed sea water will be discharged through discharge conduit 48.

The remelted solid metal shot can then be recirculated by means of the pump 38 to the spray head 14.

A gate 26 may be slidably disposed in the connecting throat 70 between the hopper 68 and the reservoir 34. This gate is slid by means of a crank 28 whose movement is controlled by a liquid level sensing device 30 which senses the level of the liquid metal within the reservoir 34. The level control 30 may be of the float valve type or any other conventional equipment. By means of the gate 26 and level control 30, the molten metal level, may be maintained below the scale removing conveyor 32.

It will thus be apparent that a method and apparatus have been disclosed for not only insuring that the sea water delivered from the brine heater to the distilling plant is at a maximum temperature, but apparatus and a method are disclosed for removing the scaling constituents from the brine and its vapor before they can reach the flash chambers and condenser tubes. Many of the problems which have heretofore made the conversion of sea water to potable water impractical are thereby avoided.

The present invention may be embodied in other specific forms without departing from the spirit or essential attributes thereof and, accordingly, reference should be made to the appended claims, rather than to the foregoing specification as indicating the scope of the invention.

I claim:

1. A method for heating sea water in a distillation plant and simultaneously removing the scaling constituents from said sea water, the method comprising the steps of heating a heat transfer medium to a temperature above the melting point of the medium and the temperature at which scaling constituents precipitate from sea water, distributing the heated heat transfer medium as a spray over a pool of sea water maintained at a temperature below the melting point of said medium so that said heat transfer medium solidifies as it falls through said pool thereby giving up its lateral heat of solidification to heat said pool and causing said scaling constituents to precipitate from said sea water pool as said solidified medium continues to fall through said pool, said precipitated scaling constituents adhering to said solidified heat transfer medium, collecting said solidified heat transfer medium and adhering scale constituents, and separating said cling scale constituents from said solidified heat transfer medium, said last-named step including adding heat to said collected solidified medium sufficient to remelt it, causing said scale to form a discrete layer above said melted medium, removing said layer of scale, and recirculating said melted medium in a distributed spray over said pool.

2. A method for heating sea water in a distillation plant and simultaneously removing the scaling constituents from said sea water, the method comprising the steps of heating a metal denser than said scaling constituents to a temperature above its melting point and the temperature at which scaling constituents precipitate from sea water, distributing the molten metal as a spray over a pool of sea water maintained at a temperature below the melting point of said metal, so that said molten metal solidifies as it falls through said pool thereby forming small globules of metal and giving up its latent heat of solidification to heat said pool and causing said scaling constituents to precipitate from said sea water pool as said metal globules continue to fall through said pool, said precipitated scaling constituents adhering to said metal globules, collecting said metal globules and adhering scale constituents, and separating said scale constituents from said metal globules by adding heat to said collected metal globules sufficient to remelt them causing said less dense scale to float to the top of said remelted metal to form a discrete layer at the boundary thereof, removing said layer of scale, and recirculating said molten metal in a distributed spray over said pool.

3. A method for heating sea water in a distillation plant comprising the steps of heating a heat transfer medium to a temperature above its melting point and the temperature at which scale forming constituents precipitate from sea water, distributing the heated medium in a spray over a pool of sea water maintained at a temperature below the melting point of said heat transfer medium so that said medium solidifies as it falls through said pool thereby giving up its latent heat of solidification and heating the pool, and collecting said solidified heat transfer medium.

4. A method for heating sea water in a distillation plant and simultaneously removing scaling constituents from said sea water, the method comprising steps of heating a heat transfer medium to a temperature above its melting point and the temperature at which scaling constituents precipitate from sea water, distributing the heated heat transfer medium as a spray over a pool of sea water maintained at a temperature below the melting point of said medium so that said medium solidifies as it falls through said pool, thereby giving up its latent heat of solidification and heating the pool and also causing said scaling constituents to precipitate from the sea water, said precipitated scaling constituents adhering to said solidified heat transfer medium, and the further step of collecting said solidified heat transfer medium and adhering scale constituents.

5. A method for heating sea water in a distillation plant and simultaneously removing the scaling constituents from said sea water, the method comprising steps of heating a heat transfer medium to a temperature above the melting point of the medium and the temperature at which scaling constituents precipitate from sea water, distributing the heated medium as a spray over a pool of sea water maintained at a temperature below the melting point of said medium so that said heat transfer medium solidifies as it falls through said pool, thereby giving up its latent heat of solidification and heating said pool and also causing said scaling constituents to precipitate from the sea water, said precipitated scaling constituents adhering to said solidified heat transfer medium, and the further step of separating said adhering scale constituents from the solidified medium.

6. A method in accordance with claim 4 wherein said separating step includes adding heat to said collected solidified heat transfer medium sufficient to remelt it causing said scale to form a discrete layer above said melted medium, and removing the layer of scale.

References Cited

UNITED STATES PATENTS

| 1,905,185 | 4/1933 | Morris | 165—107 |
| 2,601,102 | 6/1952 | Dickey | 165—107 X |
| 2,631,835 | 3/1953 | Jones | 263—19 |
| 2,796,237 | 6/1957 | Nettel | 165—107 |
| 2,976,224 | 3/1961 | Gilliland | 203—10 |
| 3,185,457 | 5/1965 | Boll et al. | 263—19 |

NORMAN YUDKOFF, *Primary Examiner.*

J. SOFER, *Assistant Examiner.*